United States Patent
Tylutki

(10) Patent No.: US 8,548,790 B2
(45) Date of Patent: Oct. 1, 2013

(54) RAPIDLY DETERMINING FRAGMENTATION IN COMPUTING ENVIRONMENTS

(75) Inventor: Marcus A. Tylutki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 12/986,522

(22) Filed: Jan. 7, 2011

(65) Prior Publication Data
US 2012/0179446 A1    Jul. 12, 2012

(51) Int. Cl.
G06F 9/455    (2006.01)
G06F 9/50    (2006.01)

(52) U.S. Cl.
USPC ........ 703/21; 703/4; 703/13; 718/1; 718/100; 718/102; 718/104; 718/105

(58) Field of Classification Search
None
See application file for complete search history.

(56) References Cited

U.S. PATENT DOCUMENTS

| | | | |
|---|---|---|---|
| 5,956,662 A * | 9/1999 | Hemker et al. | 702/182 |
| 6,507,891 B1 | 1/2003 | Challenger et al. | |
| 6,898,564 B1 * | 5/2005 | Odhner et al. | 703/21 |
| 7,174,354 B2 | 2/2007 | Andreasson | |
| 7,403,886 B2 * | 7/2008 | Odhner et al. | 703/21 |
| 7,409,316 B1 * | 8/2008 | Saghier et al. | 702/182 |
| 7,548,940 B2 | 6/2009 | Bacon et al. | |
| 8,046,767 B2 * | 10/2011 | Rolia et al. | 718/104 |
| 2005/0102121 A1 * | 5/2005 | Odhner et al. | 703/1 |
| 2007/0094375 A1 * | 4/2007 | Snyder et al. | 709/223 |
| 2008/0154559 A1 * | 6/2008 | Ram et al. | 703/6 |
| 2008/0270595 A1 * | 10/2008 | Rolia et al. | 709/224 |
| 2008/0271038 A1 * | 10/2008 | Rolia et al. | 718/105 |
| 2009/0055834 A1 * | 2/2009 | Ding et al. | 718/104 |
| 2010/0162259 A1 * | 6/2010 | Koh et al. | 718/104 |
| 2012/0005683 A1 * | 1/2012 | Bower et al. | 718/103 |
| 2012/0109619 A1 * | 5/2012 | Gmach et al. | 703/21 |
| 2012/0144008 A1 * | 6/2012 | Yuyitung et al. | 709/223 |

OTHER PUBLICATIONS

Freund, Richard, et al. "Scheduling Resources in Multi-User, Heterogeneous, Computing Environments with SmartNet" (1998) available at <http://reference.kfupm.edu.sa/content/s/c/scheduling_resources_in_multi_user_hete_269032.pdf>.*

Buyya, Rajkumar; Murshed, Manzur "GridSim: A Toolkit for the Modeling and Simulation of Distributed Resource Management and Scheduling for Grid Computing" (2003) available at <http://arxiv.org/ftp/cs/papers/0203/0203019.pdf>.*

Hillier A.; Dynamic Capacity Management in Virtual Environments:; Copyright 2004-2008; CiRBA Inc.; pp. 1-23 www.CiRBA.com.

(Continued)

Primary Examiner — Kamini S Shah
Assistant Examiner — Jay B Hann
(74) Attorney, Agent, or Firm — Cantor Colburn LLP; Prentiss Johnson

(57) ABSTRACT

A mechanism is provided for determining fragmentation in a computing environment. A simulation of virtual machine requests for resources in the computing environment is run for a predetermined time. The simulation is scaled down when the predetermined time exceeds a threshold. The scaling down includes scaling down the resources in the computing environment and/or scaling down a number of the virtual machine requests. The scaled down simulation is run iteratively to estimate relative fragmentation of the virtual machine requests against the resources in the computing environment.

12 Claims, 8 Drawing Sheets

(56) References Cited

OTHER PUBLICATIONS

Mann J. et al.; "An Analysis of Engagement Algorithms for Real-Time Weapons Effects"; JDMS, vol. 3, Issue 3, Jul. 2006; pp. 189-201.

Rigby, DJ; "A Transparent Automatic Data Management and Archiving Subsystem for VM"; Inspec/Share Eur Assoc.; pp. 439-445; vol. 2; Sep. 1987.

Rolia et al.; "A Capacity Management Service for Resource Pools"; Copyright Hewlett-Packard Company 2005; HPL-2005-1; Jan. 4, 2005.

Martha D. Delahunty and Joseph P.G. Mack, "A General Method of Curve Fitting and Error Analysis Using a Spreadsheet: Determination of the Binding Constants of Tight Binding Ligands in Variable Volume Assays," Oxford Journals; Life Sciences; Bioinformatics; vol. 9, Issue 2, pp. 127-131, 1993.

\* cited by examiner

US 8,548,790 B2

RAPIDLY DETERMINING FRAGMENTATION IN COMPUTING ENVIRONMENTS

BACKGROUND

Exemplary embodiments relate to resource management, and more specifically, to rapidly determining fragmentation in computing environments.

Utility computing delivers compute and storage resources to applications as an 'on-demand utility', similar to an electricity grid. The utility computing model is enabled by distributed collections of compute and storage resources spread over a local or a wide area network, i.e., networked utilities. Example applications include scientific workflows running on computational grids and multi-tier web services (e.g., ecommerce websites) operating in data centers. The utility setting also offers several benefits to database applications such as reduced infrastructure and management costs, higher resource utilization, and the ability to allocate resources on-demand to support dynamically changing demands.

Virtual machine (VM) technology offers powerful mechanisms for efficient management of networked utilities. After a decade of advances in VMs, robust and efficient VM systems are widely available and are fast becoming ubiquitous. The leading VM systems support live migration, checkpoint/restart, and fine-grained allocation of server resources as a measured and metered quantity. These capabilities create a rich decision space for utility resource management such as how an intelligent infrastructure should "turn the knobs" to map workload and resource requests onto a server network.

Intelligent provisioning of VMs is necessary to meet system performance goals such as meeting application Service Level Agreements (SLAs), optimizing application execution time, and maximizing overall resource usage. However, provisioning VMs to meet such goals may be considered challenging because application behavior is dictated by the interaction of several factors such as resources, data, and workload. Resources refer to the number of VMs assigned to the application, and the properties of the underlying resources bound to each VM (e.g., central processing unit, memory, storage, and network resources). The characteristics of the data that the application processes, including the input data size, data layout and partitioning on the storage server may also have an impact on application behavior. Examples of workload characteristics seen by the application and dictating application behavior include a request arrival rate and service demand of each request.

BRIEF SUMMARY

According to exemplary embodiments, a method, computer program product, and apparatus for determining fragmentation in a computing environment runs a simulation of virtual machine requests for resources in the computing environment for a predetermined time. The simulation is scaled down when the predetermined time exceeds a threshold. The scaling down includes scaling down the resources in the computing environment and/or scaling down a number of the virtual machine requests. The scaled down simulation is run iteratively to estimate relative fragmentation of the virtual machine requests against the resources in the computing environment.

According to additional exemplary embodiments, a method, computer program product, and apparatus for determining fragmentation in a computing environment determines an estimated number of resources to fit resource requirements of an ordered virtual machine request sequence. The estimated number of resources is based on a summation of available capacity on the resources. The resources define the computing environment. A simulation that applies the virtual machine requests to the computing environment in the order of the virtual machine request sequence is run. The applying includes skipping a virtual machine request that fails to fit the computing environment. The estimated number of resources is combined with a number of resources for the skipped virtual machine request to create an updated computing environment. The virtual machine requests are applied to the updated computing environment in the order of the virtual machine request sequence.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Figure 1:
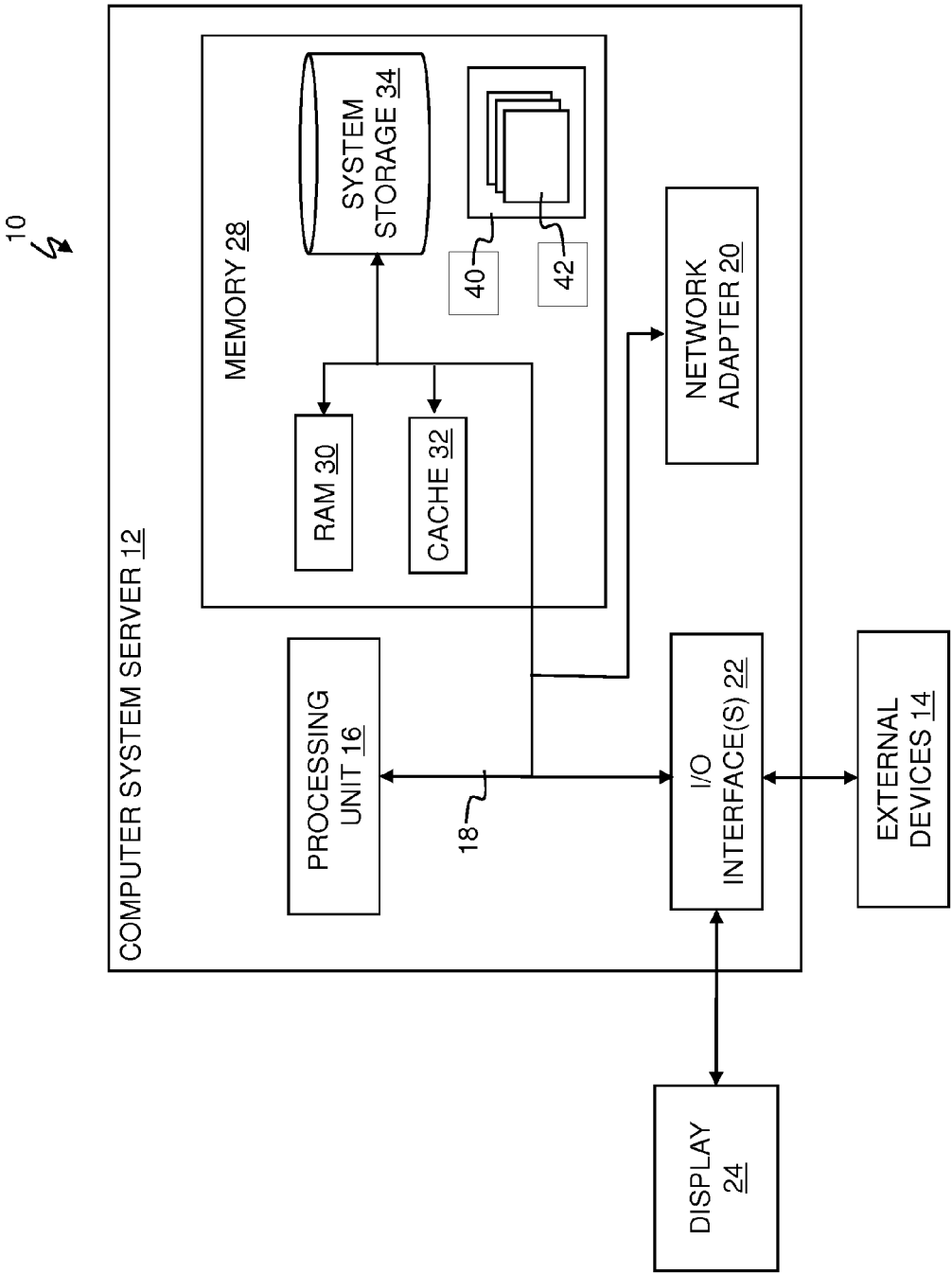
FIG. 1 illustrates a schematic of an example of a cloud computing node in accordance with an embodiment.

Embodiments described herein are directed to estimating the effects of fragmentation in a large computing environment by running simulations in a reduced computing environment and extrapolating the results to the large computing environment. Fragmentation is one of several aspects of resource management that must be addressed in highly dynamic virtualized computing environments. Fragmentation refers to the situation where there is a sufficient aggregate of resources to satisfy a virtual machine (VM) provisioning request, but none of the individual physical servers has enough local resources to satisfy the VM provisioning request and thus, the request cannot be satisfied.

Monte Carlo simulations are utilized by embodiments described herein to estimate the effects of fragmentation on a given computing environment. Inputs to the simulations include estimated VM resource requirements for a VM provisioning request (e.g., memory, central processing unit, disk storage, network bandwidth, and disk input/output bandwidth), a configured or estimated VM provisioning request rate, and a configured or estimated VM provisioning request distribution. Using these inputs, Monte Carlo simulations are executed to estimate a risk and degree of fragmentation for the computing environment. For large computing environments and/or for a large number of VM provisioning requests, the calculations can be very compute intensive, resulting in the simulation taking a relatively long amount of time.

In order to reduce the number of computations required to execute the Monte Carlo simulations, embodiments apply various reduction techniques to scale back the computing environment prior to executing the Monte Carlo simulations. One reduction technique includes reducing the number of provisioning requests, either by a percentage (e.g., execute 10% of the provisioning requests) or by a time threshold (e.g., execute simulations for a predetermined amount of time). Another reduction technique includes reducing the computing environment (e.g., number of servers, amount of memory) prior to executing the simulations. Both of these reduction techniques may be used alone or in combination with each other. As described herein below, different approaches for reducing the computing environment are utilized depending on whether the computing environment is heterogeneous or homogeneous.

For large, dynamic environments with constantly changing estimations of the volume of VM requests and their parameters, the combination of computing environment reduction techniques along with Monte Carlo simulations can be used to provide a fast prediction of the fragmentation effects on capacity, thus providing administrators of virtual computing environments rapid estimations of remaining capacity.

Estimating the capacity of a computing environment can be useful during pre-sales activities, when environments generally need to be sized to provide cost estimates to customers. There is also value in estimating the capacity when there are changes to the environment, such as when the infrastructure of the environment may changes and it may be possible to consolidate systems in an old environment into a faster but smaller hardware infrastructure. Another time when estimating the capacity of a computing environment is useful is when certain assumptions about how the environment is used have changed. Individual applications or workloads in the environment may be used more heavily or in different ways, changing the demand on specific resources in the environment. The number of environments may need to grow, and a determination should be made to determine if the current resources that are available are sufficient to handle the new types of workload requirements that will be added to the environment.

In an embodiment, predictions of the fragmentation effects on capacity are predicted for cloud computing environments. It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is generally shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the cloud computing node 10 is shown in the form of a general-purpose computing device. The components of computer system/server 12 may include, but are not limited to, one or more processors or processing units 16, a system memory 28, and a bus 18 that couples various system components including system memory 28 to processor unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
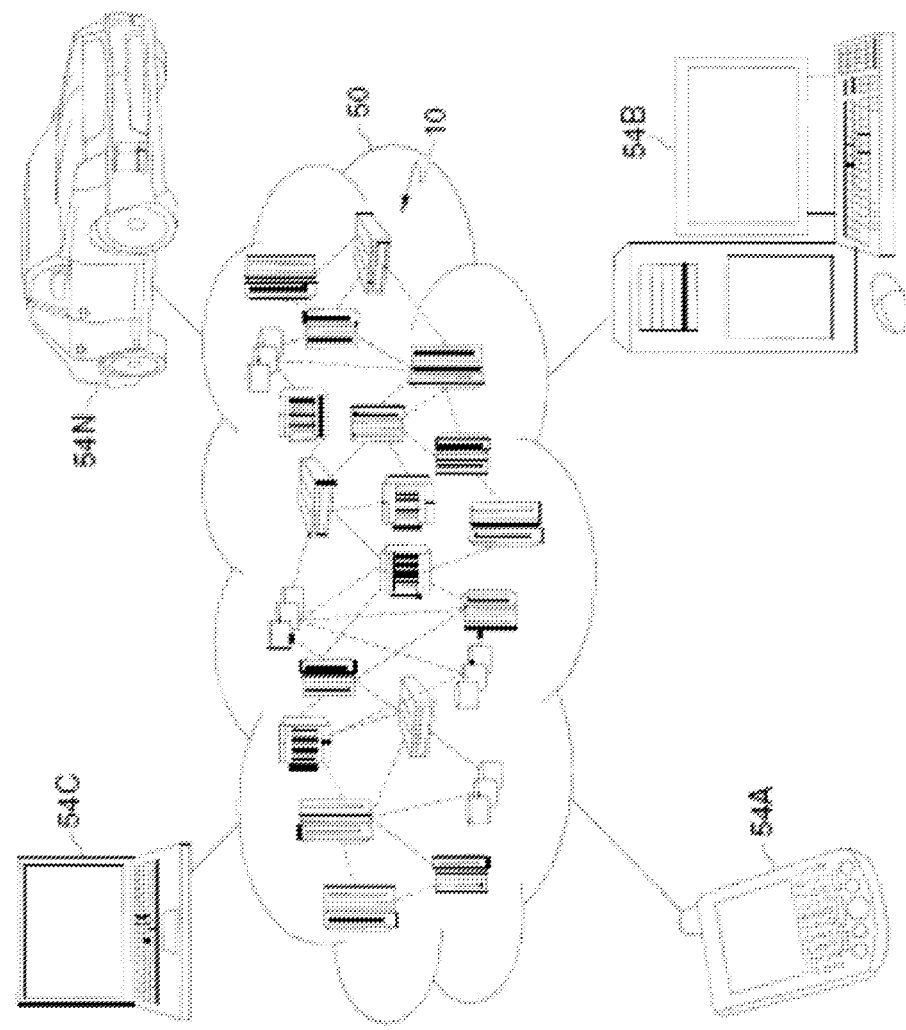
FIG. 2 illustrates a cloud computing environment in accordance with an embodiment.

Referring now to FIG. 2, a cloud computing environment 50 is generally shown. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
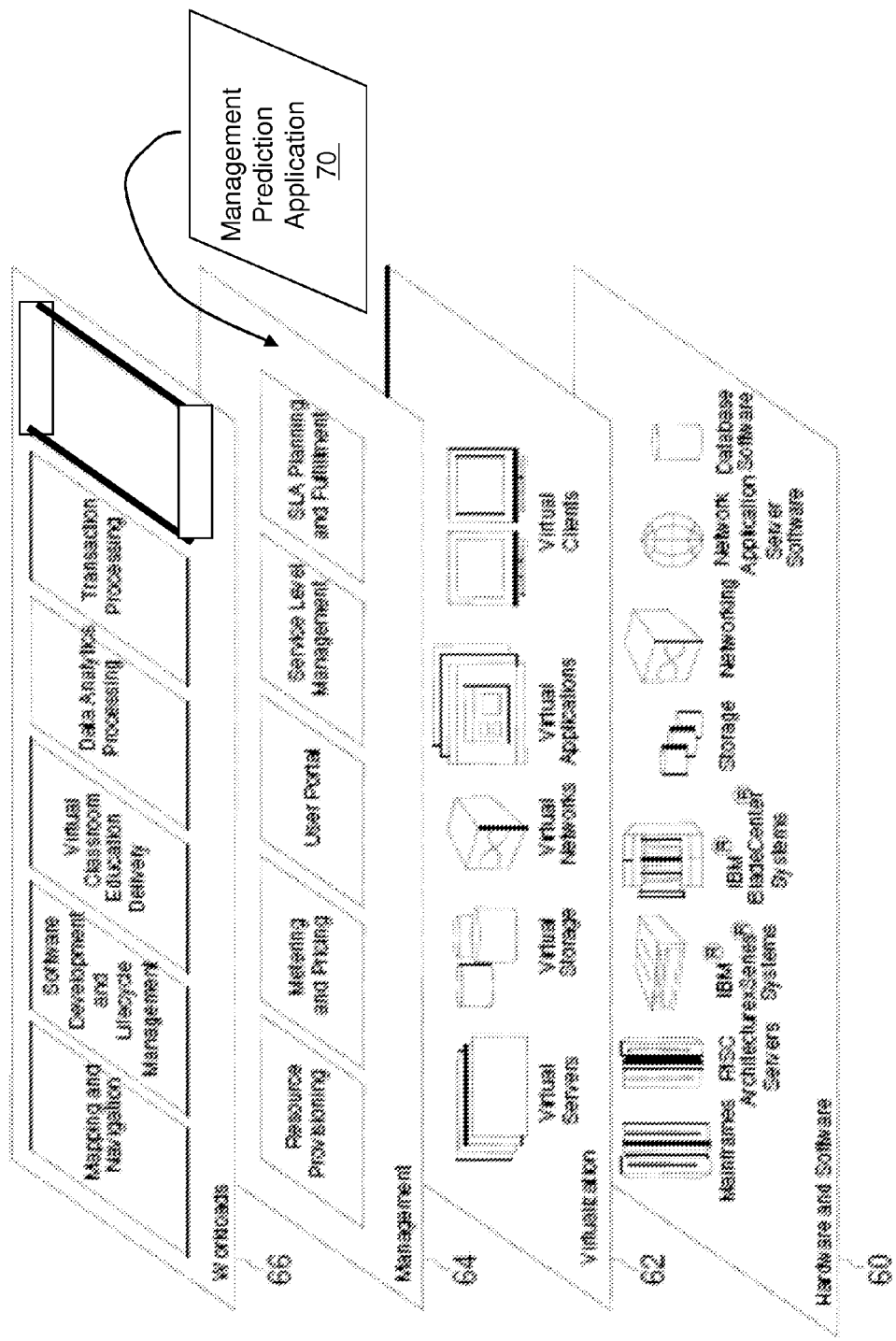
FIG. 3 illustrates a set of functional abstraction layers provided by a cloud computing environment in accordance with an embodiment.

Referring now to FIG. 3, a set of functional abstraction layers provided by cloud computing environment 50 (shown in FIG. 2) is generally shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The management layer 64 also includes management prediction application 70.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The management prediction application 70 includes one or more algorithms to implement embodiments described herein to estimate the impact of fragmentation on a computing environment. In an embodiment, the management prediction application 70 is coupled to and/or resides in the memory 28 shown in FIG. 1. In addition, embodiments of the management prediction application 70 include one or more program modules 42 of the program/utility 40 shown in FIG. 1. In a further embodiment, the management prediction application 70 is part of the management layer 64 and is executed on hardware located in the hardware and software layer 60. In accordance with an embodiment, the management prediction application 70 runs Monte Carlo simulations used to estimate the effects of fragmentation on a given environment such as computing environment 50.

The term "VM" or "virtual machine" is utilized herein to refer generally to any virtual entity in virtualization layer 62, without implying limitations. VM requests (also referred to herein as "VM provisioning requests") include requests to establish a VM on the resources in the computing environment 50. In an embodiment, the resources include the cloud computing node 10 having one or more servers 12 and include the hardware in the hardware and software layer 60. The term "iteration" as used herein refers to the act of repeating a process by the management prediction application 70 with the aim of determining, e.g., how many servers 12 are required to fit each of the virtual machines being requested in the VM requests. Each repetition of the process is also called an iteration, and the results of one iteration are used as the starting point for the next iteration.

According to an embodiment when fragmentation of virtual machines is computed, the management prediction application 70 is configured to scale back the computing environment 50 and number of virtual machine (VM) requests to different scaling factors and to determine the fragmentation for each scaling factor. Scaling factors may be referred to as load factors, scale back factors, load level, and/or load percentages, and each refers to a percentage and/or part of the entire resources (i.e., servers 12) and the entire VM requests. VM requests are requests for virtual machines to be instantiated on a physical server, e.g., such as computer system server 12.

An extrapolation point is the result/output of one or more iterations run by the management prediction application 70 for a specific load level, where the load level is the number of VM requests. There are several manners of selecting which extrapolation points to use. An example of different scaling factors for calculating 3 extrapolation points includes: a load level of 10% for one extrapolation point, a load level of 20% for a second extrapolation point, and a load level of 30% for a third extrapolation point. Additionally and/or alternatively, extrapolation points can be selected based on the compute time (of the management prediction application 70) to provide an output for the given points. After running the management prediction application 70, additional extrapolation points can also be selected by continuing to increase the scaling factor when running the management prediction application 70 until the fragmentation difference to the previous scaling factor is below a specified threshold (e.g., 4%).

The management prediction application 70 fits these extrapolation points to a curve to extrapolate resource capacity (e.g., how many servers are needed for a given amount of VM requests) to predict VM fragmentation. This can be done through several curve fitting techniques and is not limited to a particular curve fitting technique. Examples of curve fitting techniques used by embodiments include a linear curve fit, a polynomial curve fit, and/or an exponential or logarithmic curve fit. In an embodiment, multiple curve fits or extrapolation techniques are applied, and the technique with the optimal $R^2$ or similar score is chosen by the management prediction application 70. $R^2$ refers to the coefficient of determination and it measures how accurately a model (or in this case a curve) satisfies the variability within the data. A weighted $R^2$ score that favors the accuracy of the fit with the data points of the larger environments and VM request volumes is used in an embodiment.

As described previously, an embodiment reduces the computing environment by simplifying some of the details of the computing environment 50 before running the simulation of the management prediction application 70. An embodiment includes applying curve fitting when the number of VM requests and the computing environment size are scaled down, e.g., to 10%, 20%, and 30% of the original number of VM request and the original computing environment size. When scaling down the number of VM requests and/or the computing environment becomes difficult because of the uniqueness of physical system server 12 specifications and/or the uniqueness of the VM specifications in the VM requests, the management prediction application 70 is configured to first perform simplifications to the computing environment before reducing the scale. For example, in the case where the computing environment 50 being modeled has a heterogeneous environment with vastly different specifications per physical system server 12 (e.g., the computing environment 50 has many different computing system servers 12 with different specifications). In an extreme case, each physical system server 12 has a unique configuration. Simplifications and assumptions are applied by an embodiment of the management prediction application 70 in order to represent these systems in a scaled down environment, as illustrated herein. Similarly, in the case where the target steady state computing environment has VMs where no two VMs have the same requirements also requires some assumptions and simplifications to be applied before extrapolation can be performed. Once finalized, the extrapolated fragmentation of the optionally simplified environment can be used to estimate capacity of the actual environment 50.

The following describes embodiments that use Monte Carlo algorithms to estimate capacity of a given computing environment.

Certain resources of physical components of a computer environment are generally dedicated to specific virtual environments. Memory 28 is an example of a resource where a chunk of memory on a physical server 12 is dedicated to each virtual environment (including VMs) on that server 12. When determining how many virtual environments can fit on a physical server 12, the collective requirement of the amount of memory 28 required is just one of the limitations. In a managed virtualized environment (such as the virtualization layer 62) that spans multiple physical system servers 12 (in hardware and software layer 60), there is typically a management component such as, e.g., resource provisioning in the management layer 64 that determines where to place a new virtual environment request (i.e., VM request). There are many different algorithms that can be used to determine where the request should be allocated. Regardless of the algorithm used, the virtual environment or VM will ultimately be placed onto a physical server 12, and the available resources (i.e., memory 28, processing unit 16, network bandwidth of network adapter 20, etc.) of the corresponding physical server 12 are reduced by the amount that is entitled to the new VM (which was requested by a VM request).

It is possible for a VM request to be received where collectively the environment 50 has enough resources to satisfy the request, but each individual physical server 12 does not have enough local resources to satisfy the virtual environment. For example, a VM request may require 4 gigabytes (GBs) of memory. The entire pool of servers 12 may collectively have 16 GB of memory available, but each physical server 12 only has 2 GB of memory available. In this case, due to fragmentation, the VM request cannot be satisfied. The combination of the chosen VM placement algorithm and the order of VM requests are examples of factors used in determining how much fragmentation will occur in a virtualized environment. Since the order that VM requests arrive into the computing environment 50 can be highly variable, Monte Carlo simulations are used to determine how randomized orders of VM requests affect fragmentation for a specific virtualized environment. In an embodiment, these simulations are run by the management prediction application 70 using a specific VM placement algorithm.

By performing iterations (e.g., 100 iterations), where each iteration has a randomized VM request ordering, the management prediction application 70 computes an estimate of the number of servers 12 required to satisfy a given set of VMs that are expected to be managed during a peak. For example, the management prediction application 70 could indicate that on average, 20 servers would be sufficient, but in the top 1 percentile (in this case in the worst case of all 100 iterations), 25 servers would be required to handle the load (of incoming VM requests).

Figure 4:
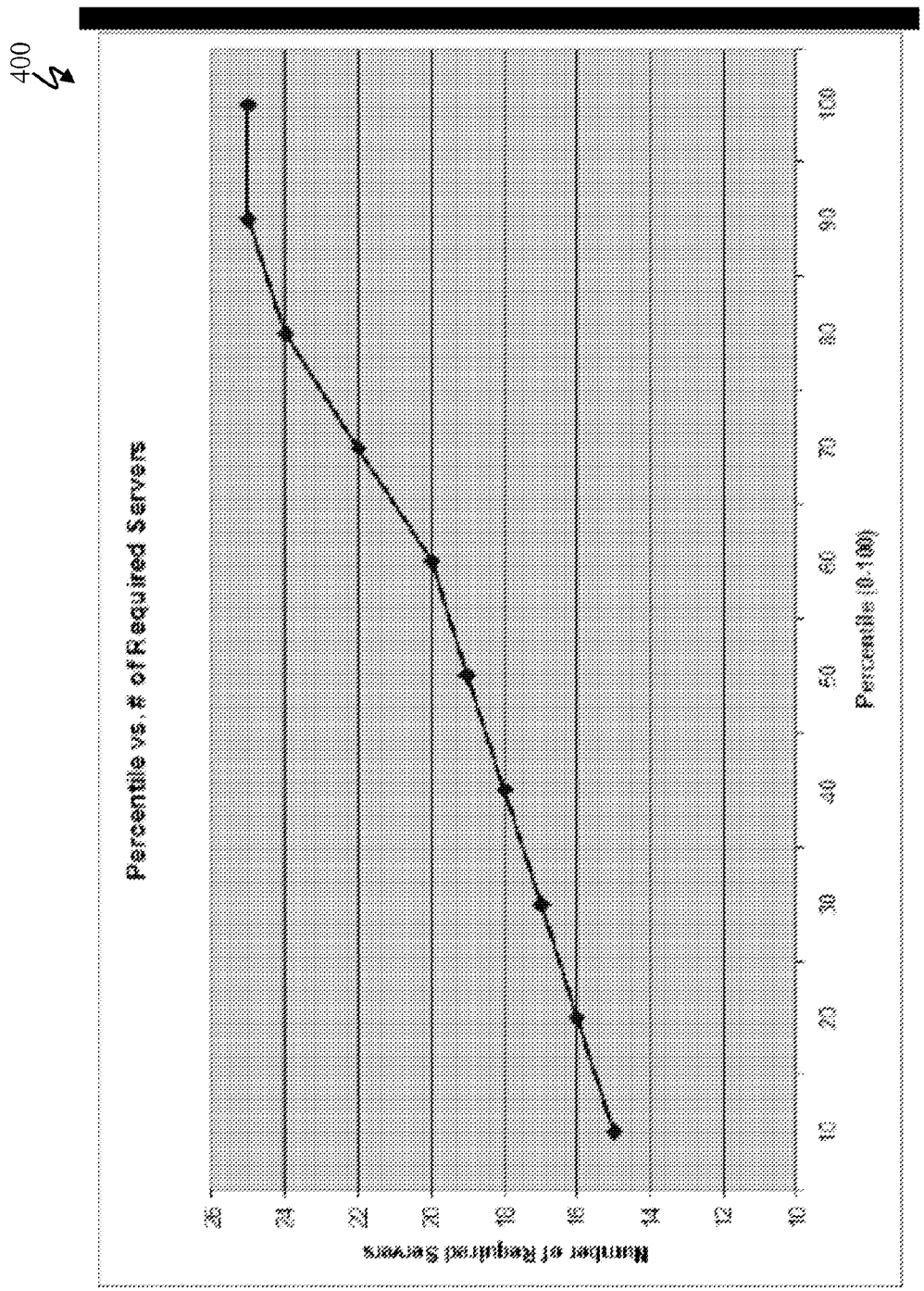
FIG. 4 illustrates a graph of a required number of servers that is generated in accordance with an embodiment.

In an embodiment, the management prediction application 70 generates a graph, such as graph 400 shown in FIG. 4, that shows the number of required servers vs. the percentile of cases that those servers satisfied. This gives system owners and administrators an idea of how much capacity they would need for the given workload (of incoming VM requests), and gives them a tool to assess any risks with choosing a number of servers that is smaller than the result of the worst case iteration. In addition or alternatively, the management prediction application 70 can be used to estimate how many workloads of a specific type can be supported in a given fixed server environment. For example, output from the management prediction application 70 could indicate that on average 2,000 VM environments could be maintained on a static server environment, but the top 1 percentile could only support 1,000 VM environments on the same 10 servers.

In accordance with an embodiment, if the graph 400 is used for forecasting, VMs that are already in the environment 50 and are expected to remain in the environment 50 in the future do not need to be modeled when running the management prediction application 70. In this case, only new anticipated future VM requests need to be provided to the VM fitting algorithm within a Monte Carlo iteration. The resource capacity of each physical server 12 has already accounted for the VMs that are already residing on them or are expected to be residing on them within the specified future time frame.

The following describes embodiments that determine a threshold when the computing environment is simplified before producing a fragmentation estimation.

In an embodiment, the management prediction application 70 is configured with a scale down threshold that determines when the Monte Carlo simulation described above requires simplification and approximations. The management prediction application 70 is configured to proportionally scale down the volume of requests for VM instances and correspondingly scale down available system resources (such as memory of the physical servers 12) in the computing environment 50. Since the amount of compute time to estimate how a VM request will be fit into the computing environment 50 is generally independent of the environment 50 and the details of the VM request, the number of concurrent VMs that exist in the hypothetical environment is matched up against a scale down threshold by the management prediction application 70. A scale down threshold can vary based on the system computing the simulations of the management prediction application 70 and the desired time the administrator would like updates and notifications. The smaller the scale down threshold that determines when the simulation of the computing environment 50 and VM requests need to be scaled down, the lower the accuracy, and the more likely that an embodiment that includes reducing the computing environment will have to be applied. If the estimation of physical servers 12 and VM requests in the computing environment 50 does not exceed this scale down threshold, the Monte Carlo results (as generated by the management prediction application 70) are computed without scaling down the simulation computing environment 50 and VM requests, and the Monte Carlo results of the management prediction application 70 are returned to the administrator.

In accordance with exemplary embodiments, a more complex threshold can be a function of the number of VM requests and the size of the environment, since the amount of time it takes to fit a given request depends on the number of available systems in the environment. In other embodiments, the threshold function also includes environment parameters, such as resource capacities per physical server 12 and infrastructure layer.

Another approach to thresholds taken by the management prediction application 70 includes attempting to compute a single Monte Carlo iteration while fitting the estimated VM requests, and halting execution after a specific time threshold has elapsed. In the resulting state, the percentage (%) of VM requests (out of the total VM requests) that were fit into the computing environment 50 in the single iteration (for the specific time threshold) is computed by the management prediction application 70. This factor, which is now a scale down factor, is then used to scale back the VM requests and the computing environment 50. The scale down factor can either be directly applied and/or it could be fed into a function of the management prediction application 70. In an embodiment, the scale down factor spans multiple iterations. For example, in one implementation, suppose 100 Monte Carlo iterations are desired (to be run by the management prediction application 70), but the computation time threshold expires in the middle of the second iteration. The result (scale down factor) may be to scale back the number of iterations to 10, and then further reducing both the number of VM requests and the environment size to 10% of their original value. This would result in a rough speed up of 100× for computing one iteration for one reference load value. Further examples are discussed herein below.

The following describes embodiments of using Monte Carlo result extrapolation to estimate the capacity of a larger environment using estimations from much smaller environments.

Which threshold to set depends on factors such as how many extrapolation (data) points will be used for extrapolation, and how distributed or high the relative load value is for each extrapolation point. For example, if an administrator wants to use a polynomial extrapolation based on 3 reference load values, choosing 10% load, 15% load, and 20% load will finish much faster than 10%, 20%, and 50% relative load values. There are different techniques that can be applied to choose which load values to use, although the constraint is that the time it takes for all load values to complete each of their iterations (run by the management prediction application 70) must be below the desired computation time threshold.

For example, suppose on the first iteration (of the management prediction application 70) computation is halted after 15 seconds, and after which 30% of the VM requests of a single iteration were completed. This time (15 seconds) for halting the first iteration will be discussed below with reference to exploratory weight. Suppose additional estimation parameters in this case are to estimate 100 iterations with a 10 iteration minimum, that a 3 (extrapolation) point curve fit should be used for approximations, and the three extrapolation points should have an equidistant distribution (i.e., each point is the same distance from each other, which is the same distance of the first point to a 0 load level) (e.g., a set of 20%, 40%, 60% load values). This would result in the following relationship:

$$P_{comp} * I_{comp} + F_{comp} = \sum_{i=1}^{|P|} i * x * I_{min}$$

Equation 1 where:
$P_{comp}$=the percentage of (Monte Carlo) iterations that were complete;
$I_{comp}$=the number of desired (Monte Carlo) iterations to complete;
$F_{comp}$=the fractional percentage of VM requests that were fit within the last iteration when computation was interrupted;
P=the number of extrapolation points to be used for (Monte Carlo) extrapolation;
$I_{min}$=the minimum number of (Monte Carlo) iterations for each data point used for extrapolation; and
x=the % of relative size of the VM requests and/or computer environment of the original request for the first reference data point used for extrapolation.

Equation 1 is solved for x as follows:

$$x = \frac{P_{comp} * I_{comp} + F_{comp}}{\sum_{i=1}^{|P|} i * I_{min}}$$

Equation 2

It will be appreciated that in the event that iterations are processed in parallel by the management prediction application 70, the formula above could easily be modified where $F_{comp}$ would apply to sum of all fractional percentages of parallel iterations when they were halted.

Applying this to the example, the variables would be assigned as follows: Pcomp=0%, Icomp=100, Fcomp=30%, |P|=3, and Imin=10. This results in a value of x=0.5%. Therefore, the 3 extrapolation (data) points that would be used for extrapolation are a load value of 0.5% with 10 iterations, 1.0% with 10 iterations, and 1.5% with 10 iterations, which would be estimated to complete in about 15 seconds. If only two iterations were required for each data point, the load values could be 2.5%, 5%, and 7.5%, which would likely be much more accurate.

At each extrapolation data point calculated by the management prediction application 70, some useful load and/or environment variable is being computed. In the case where an environment is fixed, Equation 2 computes the percentage of VM requests that can be supported, where VM requests can belong to any of multiple user or job classes.

The following describes embodiments of virtual machine and environment scaling that are used to reduce computing environments.

Scaling down an environment (e.g., computing environment 50 by the management prediction application 70) to 0.5% of the actual size as in the example above may not be trivial. The physical servers 12 in the computing environment 50 may be heterogeneous, and each server 12 may have a unique configuration and resource capacity (although such a case may be unlikely for each physical server in a very large environment). Explanations of embodiments start with how the computing environment 50 is scaled down by the management prediction application 70 in a completely homogeneous physical server environment. The first scaling (by the management prediction application 70) may involve removing servers 12 from the computing environment 50 proportional to the percentage that the environment 50 is being scaled down. If this scaling down of environment 50 fits perfectly, then this is the only scaling that is required by the management prediction application 70. For example, if there are 20 servers and the environment 50 is supposed to be scaled down to 20%, then the 20% scaled down environment 50 by the management prediction application 70 would have 4 servers.

If this scaling down (i.e., removing servers 12 from the computing environment 50 proportional to the percentage that the environment 50 before running the simulation of removing servers from the environment 50 proportional to the percentage that the environment 50) by the management prediction application 70 does not fit perfectly, then it may be desirable (in one implementation) to have the remainder (servers) to be converted into a server with fewer available resources. For example, if there are 11 servers, and the computing environment 50 should be scaled down to 10% (which is 1.1 servers), the 10% scaled down environment would have 1 of the 11 servers, plus an additional server that has only 10% of its normally available resources according to exemplary embodiments. As determined by the management prediction application 70, this scaled down environment of 1 normal server plus an additional server with only 10% of (the server 12) its normal available resources would be utilized with 10% of the total VM requests to run the simulation by the management prediction application 70. Another option in one implementation is for the management prediction application 70 to attempt to balance the remainder with the whole numbered servers. Using the previous example, the simulated environment for running the management prediction application 70 could have 2 servers, each with 55% of the capacity of each normal server. In general, there are tradeoffs on the approach chosen, because one may still want to be able to fit a VM with large requirements (e.g., large memory 28 requirements, large processing requirements for processing unit 16, large network traffic requirements network adapter 20, etc) but the administrator may want to make sure the smallest system server 12 can still fit a VM with the smallest requirements.

An alternative and/or additional approach to this scaling is for the management prediction application 70 to evenly distribute the scaling impact and keep the same number of servers. For the 11 server example, this would result in maintaining all 11 servers in the 10% scaled down environment, but each server would only have 10% of the normally available resources as determined by the management prediction application 70. This may not be desirable, since this approach will likely have undesirable affects on VM fragmentation, and may result in environments that are so scaled down, that a single VM can not fit on any of the available servers in the scaled down environment, where if the previous approach was used, the VM would be able to fit, and likely would be able to fit in the actual environment.

If the physical servers 12 in the computing environment 50 are heterogeneous, there are a few approaches that can be considered in accordance with embodiments. In one approach, servers 12 which are the same as other servers are grouped into homogeneous server pools, and any of the approaches above can be applied to each pool of servers 12. For example, a 20% reduction in the overall environment 50 would correspond to a 20% reduction in each homogenous server pool by the management prediction application 70. In cases where servers 12 in the environment are very heterogeneous, resulting in many small homogeneous server pools that collectively comprise a large environment, this approach may not be ideal. An alternative and/or additional approach for this case may be to average the resource capacities of each physical server and create a single 'homogeneous' server pool where each server has the average per server resource capacity of the entire environment, as determined by the management prediction application 70.

As an example, suppose the environment has 2 homogeneous server pools, each with 5 servers per pool. The first homogenous server pool has servers with a single 2 GHz CPU, 2 GB of memory, and 20 GB of local disk capacity, and the other homogenous server pool has a single 3 GHz CPU, 4 GB of memory, and 40 GB of local disk capacity. These specifications are merged (by the management prediction application 70) to represent 10 servers, each with a single 2.5 GHz CPU, 3 GB of memory, and 30 GB of local disk. If the environment is scaled down to 10%, this results in a single server with a 2.5 GHz CPU, 3 GB of memory, and 30 GB of local disk. If this approach were not being used, this case would have 2 servers: one with a 1 GHz CPU, 1 GB of memory, and 10 GB of disk, and one with 1.5 GHz CPU, 2 GB of memory, and 20 GB of local disk, where the first server may not be big enough to fit any of the VMs, resulting in a much more inaccurate estimate for capacity. A hybrid approach implemented by embodiments merges similar homogeneous pools, but keeps other homogeneous pools separate. For example, it may not be ideal to average single core systems with 4 GB of memory with 64 core systems with 2048 GB of memory. One example of evaluating (by the management prediction application 70) how close a server is to another server is to compute a weighted score for each server system server 12, based on the available resources:

$$S_j = \sum_{i \in R} W_i * C_{i,j} \qquad \text{Equation 3}$$

where:
$S_j$=the computed score for physical server j;
R=the set of resources (e.g., CPU, memory, disk, network bandwidth);
$C_{ij}$=the resource capacity of the server j for the resource i; and
$W_i$=the weight of resource i.

Servers that have scores within a specific static threshold can be merged as determined by the management prediction application 70. In one embodiment, an expansion to this includes a minimal homogenous server pool size threshold. For example, suppose the minimal size for a given homogenous server pool is 1 server system. Suppose that some of the homogenous server pools are merged (by the management prediction application 70) because their scores were within the specified initial static threshold, as described in the examples above. However, after scaling down the environment, one of the resource homogenous server pools results in 30% of the capacity of a single server of that pool (when the single server is not scaled down). As a result, that resource homogenous server pool is merged with the homogenous server pool having the next closest score until all homogenous server pools have at least 1 server each (where the 1 server is equivalent to the resources of a singe sever that is not scaled down).

Scaling down the network and other infrastructure layers can be adapted from the embodiments described above for scaling down servers and homogenous resource server pools.

Similarly, the VM request parameters may also not be homogeneous. Each VM in the VM requests could have a unique resource requirement that differentiates it from every other VMs in the server 12. The embodiments described above for reducing the server environment size can be used for reducing the pool of VM requests and their corresponding requirements. VM requests could be grouped into homogeneous VM request pools, similar to the homogeneous server resource pools described above, where VMs requests in each VM requests pool have the same requirements for each resource category. The merging, scoring, and different threshold embodiments described above would be equally valid when attempting to scale down the number of VM requests in the environment as well.

The following describes embodiments for providing real-time capacity estimations of live, virtualized environments.

The embodiments described above include an implementation of an algorithm (in the management prediction application 70) that performs the VM fitting (described in Using Monte Carlo Algorithms to Estimate Capacity section), along with the set of VM requests and each of their resource requirements, and the given environment specification along with the resource capacity per server in the environment, all of which can be implemented in the management prediction application 70. If this implementation is being used to forecast capacity of a virtualized environment in the near future, estimating what VM requests will be submitted along with their resource requirements may seem difficult to predict. In an embodiment, the VM fitting algorithm and the environment are assumed to be constant for near-future predictions. There are numerous trend analysis techniques that can be applied to estimate future VM requirements. However, the choice and configuration of a particular technique is based on user behavior assumptions as well as infrastructure and VM management limitations.

Figure 5:
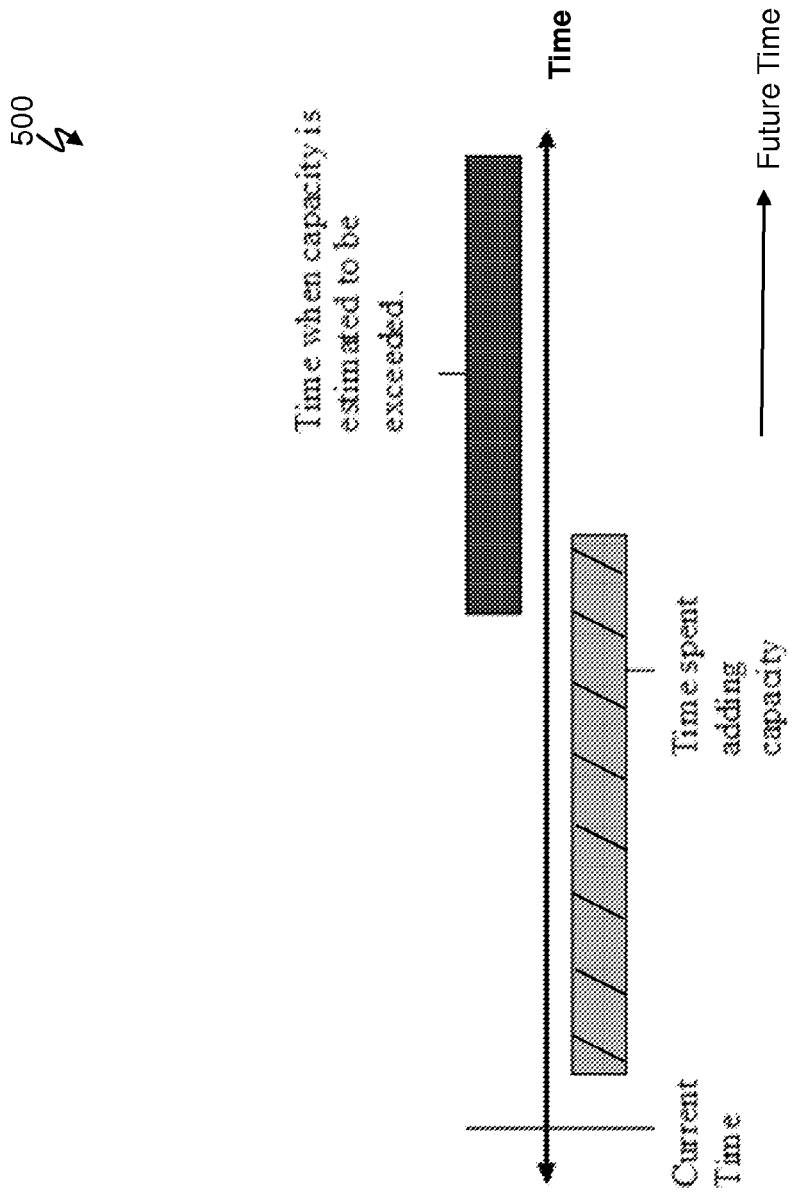
FIG. 5 illustrates a diagram of time intervals for reporting in accordance with an embodiment.

Once complete, an administrator of a large virtualized environment could use an embodiment of the management prediction application 70 to receive updates every minute to be notified if the current environment capacity is enough to handle the predicted load. There could be multiple predefined time intervals associated with the reports of when capacity will be exceeded. FIG. 5 illustrates a diagram 500 that gives an example of two intervals in accordance with exemplary embodiments. The first interval to the left has diagonal stripes. The first interval corresponds to the time it takes for system administrators to obtain and set up additional infrastructure for capacity, and the second interval (having no stripes) indicates when capacity will be exceeded. The diagram 500 shows that capacity will not be ready by the time that it is estimated that the capacity will be exceeded, and therefore a warning to the administrator should be issued by the management prediction application 70. The value of such warnings can be weighted with how far into the future the predictions occur. Warnings of when capacity will be exceeded that are closer to the current time should have a much higher weight than warnings that are several years into the future.

The administrator could also utilize the management prediction application 70 to provide real-time estimates for multiple time periods in the future. For example, suppose that every 5 minutes, the administrator prefers an estimate for 1 hour in the future, 1 day in the future, 1 week in the future, and 1 month in the future. Each of these estimates could be recomputed within 5 minutes, and the thresholds above could be applied to provide warnings to the administrator if they are applicable.

Further, the migration of VMs to other server systems (either dynamically or manually) can also be accounted for. Although live migrations may mitigate the effects of fragmentation, VM migrations consume significant physical resources (e.g., disk bandwidth, network bandwidth, and some relatively small amount of CPU time), which may impact other VMs if the corresponding free physical resources are limited. Migration calculations can also be factored into the risk computed by the results. Using the example above, if the average requirement is 20 servers, but the top 1 percentile requires 25 servers, this information can be used to estimate the likelihood of required migrations, and how often an administrator may be required to perform such migrations to meet the demands of new VM requests.

The following provides further details on an embodiment that utilizes Monte Carlo simulations of the management prediction application 70 to predict how many servers 12 are required to satisfy a fixed workload, e.g., VM requests. One embodiment includes running the management prediction application 70 for an environment of a particular size, randomizing the ordering of all of the VM requests, and seeing if the environment can fit the requests. If the environment fails to satisfy all VM requests, then the management prediction application 70 executes a brand new simulation with the same environment with one more physical server node.

Another embodiment starts with an environment equal to the bare minimum required by all of the VM requests. For example, if all of the workloads of VM requests collectively require 16 CPUs and 32 GB of memory (as determined by the management prediction application 70), and each server 12 has 2 CPUs and 4 GB of memory, then the management prediction application 70 would start with 8 servers. From there, exemplary embodiments continue to use the management prediction application 70 for combining an exponential ramp up and a binary search (after the first failure to fit a VM request) to hone in on the exact environment size required. This approach yields reasonably fast results and ensures accuracy.

Another embodiment provides faster results and follows, what is referred to herein as an A* algorithm. An embodiment of the A* algorithm of the management prediction application 70 evaluates states by calculating the best case transition to the goal state. In this context, a state is defined to the number of servers 12 or the environment load factor of a given server environment, and the goal state is the minimum number of servers required to fit all of the given VM requests of a given VM request sequence by the management prediction application 70. The management prediction application 70 starts with the bare minimum required number (#) of servers required to fit the VM requests based on VM request resources required for the VM requests and finding enough servers 12 to total the VM request resources (by summing available capacity without accounting for VM fragmentation at this point). When the next VM request does not fit, the management prediction application 70 recalculates the additional minimum number of servers 12 required. The management prediction application 70 does this by taking the remaining VM requests that can fit, and fitting them (the remaining VM requests) into the current computing environment 50 of the simulation (while skipping each VM request that will not fit the computing environment 50). The resource requirements of VM requests (VMs) that cannot fit (i.e., skipped VM requests) are then summed (e.g., to obtain a total amount of memory, total CPUs, etc.) by the management prediction application 70, and the resulting number of additional servers 12 are calculated by the management prediction application 70. The entire simulation (run by the management prediction application 70) then repeats with this new environment size, using the same randomized order of VM requests as in the previous simulation. Additional overall simulation iterations would repeat this entire process with a different randomized order of VM requests by the management prediction application 70.

An example starts the 8 servers (e.g., server 12) mentioned above and a specific randomized sequence of VM requests (S). After adding one VM request to the computing environment 50 during a simulation of the management prediction application 70, the attempt to add that VM request fails. The management prediction application 70 moves to the next VM request in the randomized ordered sequence S of VM requests. The remaining VM requests that can fit in the environment are fitted (by the management prediction application 70) as if the attempt to add the earlier VM request never failed. The sum of the resource requirements of the remaining VM requests (which were skipped because they failed) is about 3 CPUs and 6 GB of memory, so the entire sequence of S (run earlier by the management prediction application 70) starts over again with an environment of 10 servers. The bare minimum required # (number) of servers (which is 8 servers) is added to the resource requirements of the remaining skipped VM requests (which is 2 servers) for a total of 10 servers for the next simulation run by the management prediction application 70. Two servers are added to the computing environment 50 by the management prediction application 70 because above each server has 2 CPUs and 4 GB of memory, and a single server would not have enough resources to meet the resource requirements (i.e., 3 CPUs and 6 GB of memory) of the skipped VM requests that remain.

It will be appreciated that although with Monte Carlo iterations the management prediction application 70 may be given some inputs which are completely randomized, and apply the inputs in the randomized order to get an idea for how the computing environment 50 would behave if the inputs (i.e., VM requests) were random, for things like bounding risk, the prediction management application 70 is not limited to such a case. For example, the pool of VM requests taken as an input can be based on historical and/or projected expectations of VM requests that would go into the computing environment 50. Historic components can also be injected into the properties making the resulting VM request sequences for testing pseudo-random. As an example, suppose all VM requests are made for a single VM size and always in batches of 10-100. It may not be ideal to then test a case where different VM sizes are interleaved. With interleaved VM sizes, one would see 10 small VM requests, followed by 50 medium VM requests, but usually not 1 small, 2 medium, 3 small, etc. Groupings of VM sizes for virtual machine requests can be applied to the 'randomized' VM request sequences that are used in the Monte Carlo predictions.

Time patterns can also be applied. Suppose those groupings only apply to the hours of 9:00-10:00 AM. Time patterns can also be applied to the generated VM sequences to make them more closely minor expected behaviors.

Rather than starting with a blank slate environment, the current allocations of VM request (i.e., VMs) in the cloud environment 50 can also be inserted when defining the environment. This information can be received real-time from the cloud management systems.

Figure 6:
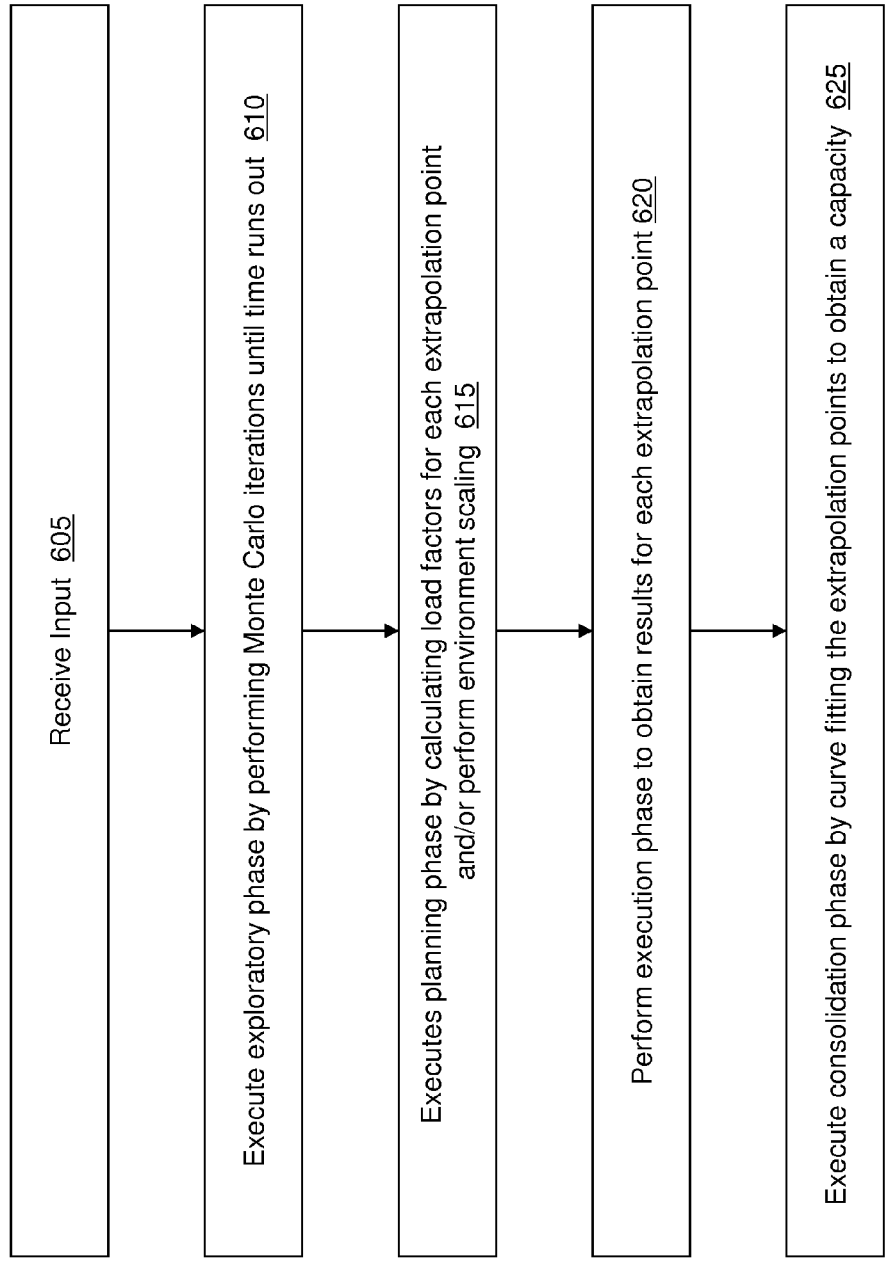
FIG. 6 illustrates a flow chart of a process to run a simulation in accordance with an embodiment.

Referring to FIG. 6, a flow chart 600 of a process implemented by the management prediction application 70 (e.g., on a computer system like the computer server 12) to run a simulation is generally shown. The simulation shown in FIG. 6 is utilized to determine VM fragmentation for VM requests to instantiate VMs in an environment like the computing environment 50 in accordance with exemplary embodiments.

The management prediction application 70 is configured to receive input at block 605. The input may include total computation time, exploratory weight, the number of extrapolation points (e.g., 3 points), and/or the distance between extrapolation points. The exploratory weight is the weight of time that should be spent on calculating the load factors for the extrapolation points. In the examples described in Monte Carlo Result Extrapolation section, 15 seconds was used for the initial simulations to determine load factors for the 3 extrapolation points, and 15 seconds was used to calculate results for the 3 extrapolation points, indicating a 50%/50% split. Alternative splits can be specified and used if desired. This would change Equation 1 to the following formula:

$$P_{comp} \cdot I_{comp} + F_{comp} = w_{pre} \cdot T \qquad \text{Equation 4}$$

$$\sum_{i=1}^{|P|} i \cdot I_{min} \cdot x = w_{post} \cdot T \qquad \text{Equation 5}$$

$$x = \frac{w_{post}}{w_{pre}} \cdot \frac{P_{comp} \cdot I_{comp} + F_{comp}}{\sum_{i=1}^{|P|} i \cdot I_{min}} \qquad \text{Equation 6}$$

where T is the total time of the entire process, Wpre is the precalculation weight or percentage, and Wpost is the postcalculation weight or percentage. In Monte Carlo Result Extrapolation section, T was equal to 30 seconds and Wpre=Wpost=1. If 80% of the time should be spent on calculation for the extrapolation points, and 20% on the initial iterations for a 30 second total computation time, then x would be 4 times larger (as Wpost/Wpre=4), and the precalculation phase would be constrained to 6 seconds, with the post calculation phase having 24 seconds.

The management prediction application 70 is configured to perform an exploratory phase, or simulation, at block 610. For example, the management prediction application 70 is configured to perform Monte Carlo iterations until time runs out, e.g., until the total computation time (threshold) runs out.

The management prediction application 70 is configured to perform the planning phase at block 615. For example, the management prediction application 70 is configured to calculate the load factors for each extrapolation point. Any approach combined or separate described herein may be utilized to calculated load factors. For example, the management prediction application 70 may run the simulation until the predefined computation time runs out. Based on the % (percentage) of VM requests fitted out of the total VM requests, the management prediction application 70 utilizes the determined % (percentage) for the first extrapolation point, twice the percentage for the second extrapolation point, and three times the percentage for the third extrapolation point. For example, the management prediction application 70 may utilize Equation 2 to determine the load factors for each extrapolation point. For example, assume the prediction management application 70 determines the load facts as 10%, 20%, and 30% for the 3 extrapolation points. Also, the management prediction application 70 is configured to perform environment scaling (if desired) as shown in FIG. 7.

The management prediction application 70 is configured to perform the execution phase at block 620. For example, the management prediction application 70 may execute the A* algorithm to obtain results for each extrapolation point, where each extrapolation point is determined from one or more Monte Carlo iterations, and the A* algorithm can be used for each iteration. The result at each extrapolation point is for a given amount of VM requests, a certain amount of servers are required.

The management prediction application 70 is configured to perform the consolidation phase at block 625. The management prediction application 70 is configured to curve fit the extrapolation points to obtain capacity requirements estimate based on the calculated extrapolation points. For example, the management prediction application 70 fits the 3 extrapolation points to a curve, e.g., to display the required servers versus percentile as illustrated in FIG. 4, and/or to display the required servers per amount of VM requests.

Figure 7:
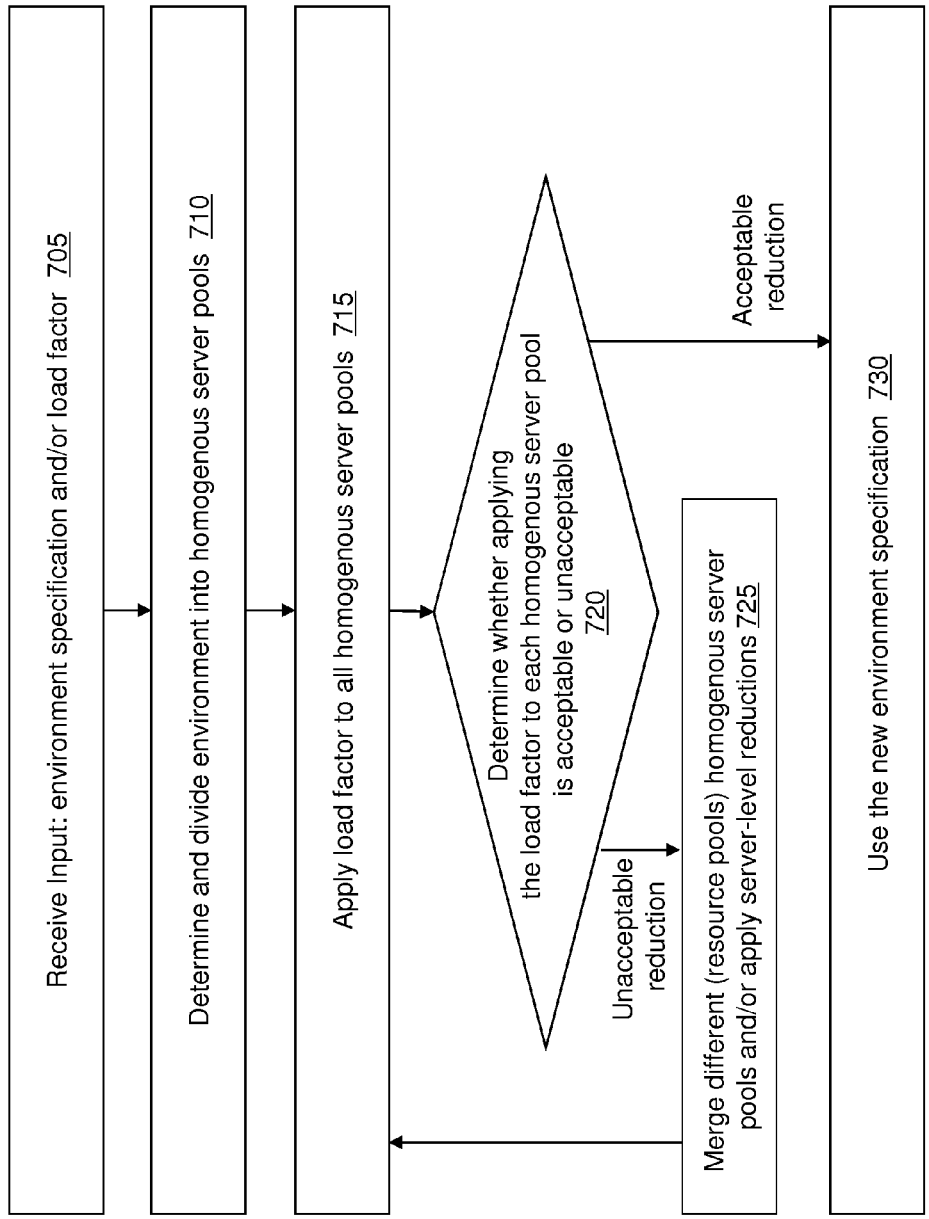
FIG. 7 illustrates a process flow for performing environment scaling in accordance with an embodiment.

An embodiment of environment scaling by the management prediction application 70 is generally shown in FIG. 7. FIG. 7 further illustrates the planning phase in block 615 of FIG. 6.

The management prediction application 70 receives inputs at block 705. The inputs may include the specifications for the environment (e.g., how many servers, what type of resources (amount of memory, processor speed, number of processor cores, etc.) are on each of the servers, etc.) and/or the load factor (10%, 20%, and 30%) calculated in FIG. 6.

The management prediction application 70 is configured to divide the environment into different homogenous server pools at block 710. For example, the management prediction application 70 groups servers having the same specifications, such as memory, processor speed, number of processors (cores), etc., into the same homogenous server pool. There may be one or more homogenous server pools as discussed herein.

The management prediction application 70 is configured to apply the load factor to each homogenous server pool at block 715. If the management prediction application 70 is running for the first extrapolation point the load factor is 10%, if the second, the load factor is 20%, and so forth.

For each separate homogenous server pool, the management prediction application 70 is configured to determine whether applying the load factor to that homogenous server pool is an acceptable reduction or an unacceptable reduction at block 720. This may be determined by the management prediction application 70 as discussed in the Virtual Machine and Environment Scaling section.

When the load factor applied to the homogenous server pools is unacceptable, the management prediction application 70 is configured to merge the resource pools of homogenous server pools and/or apply server-level reductions, and then the load factor is applied again for all homogenous server pools at block 725.

When the load factor applied to the homogenous server pools is acceptable, the management prediction application 70 is configured to use the new environment specification, which is the scaled down environment of servers based on the load factors at block 730.

Figure 8:
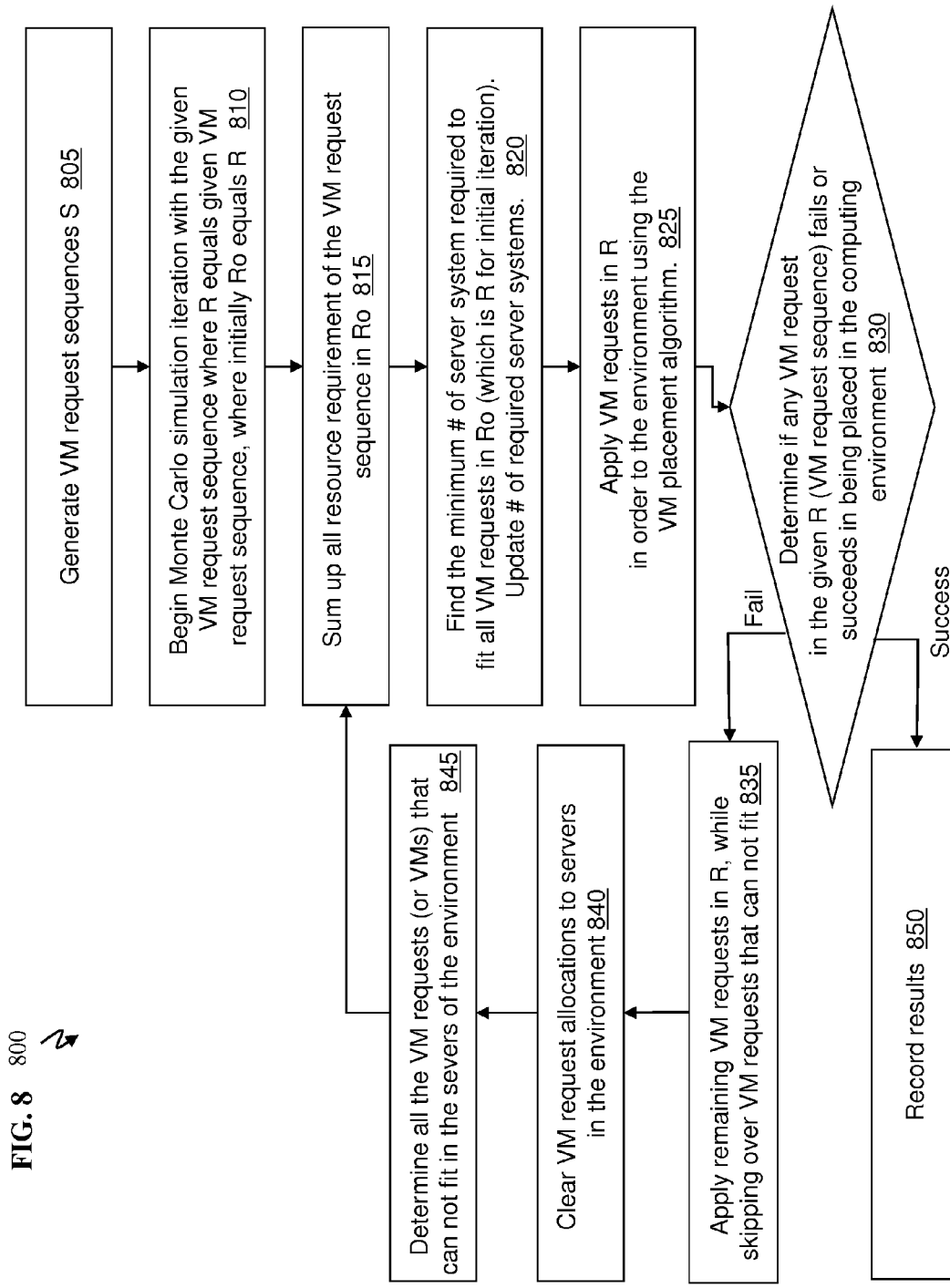
FIG. 8 illustrates a flow chart in accordance with an embodiment.

Referring to FIG. 8, a process flow 800 of an embodiment of the A* algorithm executed by the management prediction application 70 is generally shown. The process flow 800 of FIG. 8 further describes the execution phase in block 620 of FIG. 6.

The management prediction application 70 is configured to generate 1 through N virtual machine (VM) request sequences at block 805. N is a number that represents the last of all sequences of VM requests. Each of the N generated sequences can be processed in parallel to individual processing components of 810, where one sequence is passed to each processing component.

The management prediction application 70 is configured to begin running run the Monte Carlo simulation iteration with the given VM sequence S at block 810. R=given VM sequence S. Initially, Ro=R.

The management prediction application 70 is configured to sum all resource requirements of servers to meet Ro at block 815. That is, the resource requirements for each VM request in the (first) VM request sequence is summed. For example, the resource requirements for the VM request sequence may collectively require 16 CPUs and 32 GB of memory. It will be appreciated that resource requirements include, but are not limited to memory requirements, CPU requirements, disk storage, network bandwidth, disk IO bandwidth, and the like.

The management prediction application 70 is configured to determine the minimum # (number) of systems required to fit all VM requests (per VM request sequence) in Ro at block 820. For example, 8 servers may be initially determined as the bare minimum computing environment 50 for the simulation. As will be seen below, the management prediction application 70 updates the # (number) of sever systems in the environment after each VM request sequence The management prediction application 70 is configured to apply VM requests in R (in the order of the VM request sequence) to the computing environment 50 using the existing placement algorithm of the computing environment 50 at block 825. The prediction management application 70 is now trying to fit VM requests of the first VM request sequence.

The management prediction application 70 determines whether each particular VM request in the given R (VM request sequence) fails or succeeds in being placed in the computing environment at block 830. Note that R=Ro for the first iteration. If any VM request fails, the management prediction application 70 progresses to block 835. If all VM requests succeed, the management prediction application 70 progresses to block 850.

When a VM request in R (VM request sequence) fails, the management prediction application 70 is configured to skip the failed VM request and apply the remaining VM requests in (the VM request sequence) R at block 835. When running the simulation, the management prediction application 70 skips over any VM requests in R that cannot fit in the computing environment and continues to the next VM request in R.

The management prediction application 70 clears VM allocations to servers in the computing environment at block 840.

The management prediction application 70 determines all the remaining VM requests (or VMs) that cannot fit in the servers 12 of the computing environment 50 and these remaining VM requests are now Ro at block 845.

Back to block 815, the management prediction application 70 sums up all the resource requirements for the skipped VM requests in Ro. For example, the management prediction application 70 determines each of the skipped VM requests in the (VM request sequence) R, and finds the total of resource requirements (e.g., 3 CPU and 6 GB of memory) for those skipped VM requests in Ro.

Back to block 820, the management prediction application 70 is configured to determine the minimum # (number) of server systems required to fit all VM requests (per VM request sequence) in Ro, which is now the skipped VM requests. The management prediction application 70 determines that 2 servers are needed for the skipped VM requests in Ro (similar to the example discussed in the A* Algorithm section). For an updated environment, the management prediction application 70 updates the # (number) of servers in the computing environment 50 to a total of 10 servers.

The management prediction application 70 applies the VM requests in R (VM request sequence) in the same randomized order to the updated computing environment using the VM placement algorithm at block 825.

Assume that no VM requests in R (for the updated environment) fail in block 830. The management prediction application 70 is configured to record the results for this (first) extrapolation point for this (first) VM request sequence S at block 850. The results for this extrapolation point include the servers required to meet the VM request sequence without fragmentation. Accordingly, after running 1-N VM request sequences S, the management prediction application 70 has a total amount of severs needed for the 1-N VM request sequence at the load factor (e.g., 10% of the total environment) determined in block 615, which is e.g., the first extrapolation point. The management prediction application 70 may average these results, take the highest result, and/or take the middle result as the extrapolation point at this load fact. The management prediction application 70 continues to run the simulation for the other load factors which may be 20% of the original computing environment and 30% of the original computing environment. After running the A* algorithm of the management prediction application 70, each load factor 10%, 20%, and 30% has its corresponding required number of servers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for determining fragmentation in a computing environment, comprising:
   running a simulation of virtual machine requests for resources in the computing environment for a predetermined time;
   scaling down the simulation when the predetermined time exceeds a threshold to create a scaled down simulation, the scaling down the simulation including at least one of scaling down the resources in the computing environment and scaling down a number of the virtual machine requests; and
   iteratively running the scaled down simulation to estimate relative fragmentation of the virtual machine requests against the resources in the computing environment.

2. The method of claim 1, wherein scaling down the resources in the computing environment includes reducing at least one of a number of servers in the computing environment and the number of the virtual machine requests according to load factors.

3. The method of claim 1, further comprising calculating load factors as a scaling amount, wherein the load factors are calculated based on an amount of virtual machine requests that are processed during the predetermined time.

4. The method of claim 1, further comprising:
   running the scaled down simulation for a plurality of extrapolation points each having a different load factor;
   calculating results for the scaled down simulation corresponding to each of the plurality of extrapolation points; and
   curve fitting the results for each of the plurality of extrapolation points to obtain a capacity requirement estimate for the virtual machine requests.

5. A computer program product for determining fragmentation in a computing environment, comprising a non-transitory storage medium readable by a processing circuit and storing instructions for execution by the processing circuit for performing a method comprising:
   running a simulation of virtual machine requests for resources in the computing environment for a predetermined time;
   scaling down the simulation when the predetermined time exceeds a threshold to create a scaled down simulation, the scaling down the simulation including at least one of scaling down the resources in the computing environment and scaling down a number of the virtual machine requests; and
   iteratively running the scaled down simulation to estimate relative fragmentation of the virtual machine requests against the resources in the computing environment.

6. The computer program product of claim 5, wherein scaling down the resources in the computing environment includes reducing at least one of a number of servers in the computing environment and the number of virtual machine requests according to load factors.

7. The computer program product of claim 5, further comprising calculating load factors as a scaling amount, wherein the load factors are calculated based on an amount of virtual machine requests that are processed during the predetermined time.

8. The computer program product of claim 5, further comprising:
   running the scaled down simulation for a plurality of extrapolation points each having a different load factor;
   calculating results for the scaled down simulation corresponding to each of the plurality of extrapolation points; and
   curve fitting the results for each of the plurality of extrapolation points to obtain a capacity requirement estimate for the virtual machine requests.

9. An apparatus for determining fragmentation in a computing environment, comprising:
   memory for storing a program; and
   a processor, functionally coupled to the memory, the processor being responsive to computer-executable instructions contained in the program and operative for:
   running a simulation of virtual machine requests for resources in the computing environment for a predetermined time;
   scaling down the simulation when the predetermined time exceeds a threshold to create a scaled down simulation, the scaling down the simulation including at least one of scaling down the resources in the computing environment and scaling down a number of the virtual machine requests; and iteratively running the scaled down simulation to estimate relative fragmentation for the virtual machine requests against the resources in the computing environment.

10. The apparatus of claim 9, wherein scaling down the resources in the computing environment includes reducing at least one of a number of servers in the computing environment and the number of virtual machine requests according to load factors.

11. The apparatus of claim 9, wherein the processor is operative for calculating load factors as a scaling amount, wherein the load factors are calculated based on an amount of virtual machine requests that are processed during the predetermined time.

12. The apparatus of claim 9, wherein the processor is operative for:

running the scaled down simulation for a plurality of extrapolation points each having a different load factor;

calculating results for the scaled down simulation corresponding to each of the plurality of extrapolation points; and curve fitting the results for each of the plurality of extrapolation points to obtain a capacity requirement estimate for the virtual machine requests.

\* \* \* \* \*